United States Patent
Zhou et al.

(10) Patent No.: US 9,821,729 B2
(45) Date of Patent: Nov. 21, 2017

(54) JACK-POSITIONING DEVICE

(71) Applicant: FORD GLOBAL TECHNOLOGIES, LLC, Dearborn, MI (US)

(72) Inventors: Han Zhou, Nanjing (CN); Brenna Liu, Nanjing (CN); Jack Xu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/161,510

(22) Filed: May 23, 2016

(65) Prior Publication Data

US 2017/0021777 A1    Jan. 26, 2017

(30) Foreign Application Priority Data

Jul. 23, 2015   (CN) .......................... 2015 1 0438478

(51) Int. Cl.
*B66F 3/00* (2006.01)
*B60R 11/06* (2006.01)
*B60R 16/04* (2006.01)
*B66F 3/12* (2006.01)
*B66F 3/30* (2006.01)

(52) U.S. Cl.
CPC ................ *B60R 11/06* (2013.01); *B66F 3/12* (2013.01); *B66F 3/30* (2013.01)

(58) Field of Classification Search
CPC ...... B66F 3/12; B66F 3/24; B66F 3/30; B66F 3/32; B60R 11/16; B60R 16/04
USPC ......... 248/500, 503, 346.3, 188.2, 352, 499, 248/505, 510; 254/122, 124, 126, 133 R, 254/134; 180/68.5
See application file for complete search history.

(56) References Cited

U.S. PATENT DOCUMENTS

| | | | | |
|---|---|---|---|---|
| 1,519,854 A | * | 12/1924 | Lockwood | B60K 11/08 24/1 |
| 4,508,794 A | * | 4/1985 | Wright | B60R 16/04 429/100 |
| 4,760,000 A | * | 7/1988 | Williams | H01M 2/32 429/121 |
| 5,104,170 A | * | 4/1992 | Rich | B60R 11/06 248/505 |
| 5,449,149 A | * | 9/1995 | Popowich | B66F 3/12 254/126 |
| 5,462,250 A | * | 10/1995 | Fells | B60T 17/221 248/349.1 |

(Continued)

FOREIGN PATENT DOCUMENTS

CN    203093931    7/2013

*Primary Examiner* — Tan Le
(74) *Attorney, Agent, or Firm* — Mohr Intellectual Property Law Solutions, PC

(57) ABSTRACT

The present invention, in one or more embodiments, provides a jack-positioning device of jack including a seating bottom and a loading table, where the jack-positioning device includes a base portion to support the seating bottom of the jack, an arm portion to connect the base portion, and a top portion to press against the loading table of the jack, and where the top portion along with the arm portion is to position the jack at a holding position, and the arm portion is rotatable relative to the base portion and the top portion. The jack-positioning device of the present invention may be employed to position the jack within a tight space in a relatively time efficient manner.

17 Claims, 3 Drawing Sheets

(56) References Cited

U.S. PATENT DOCUMENTS

| | | | | |
|---|---|---|---|---|
| 5,915,672 | A * | 6/1999 | Dickey | B66F 3/24 |
| | | | | 248/352 |
| 5,979,953 | A | 11/1999 | Rinehart | |
| 6,070,856 | A * | 6/2000 | Alten | B66F 3/12 |
| | | | | 254/122 |
| 6,227,428 | B1 * | 5/2001 | Lewis | B60R 11/06 |
| | | | | 224/402 |
| 6,827,169 | B1 * | 12/2004 | Van Hout | B60R 16/04 |
| | | | | 180/68.5 |
| 7,931,247 | B2 * | 4/2011 | Kim | B60R 11/06 |
| | | | | 248/500 |
| 2004/0036307 | A1 | 2/2004 | Foat et al. | |
| 2007/0176452 | A1 | 8/2007 | Schultz et al. | |
| 2012/0228352 | A1 | 9/2012 | Dawe et al. | |
| 2015/0014610 | A1 * | 1/2015 | Xu | B62D 43/10 |
| | | | | 254/126 |
| 2017/0021777 | A1 * | 1/2017 | Zhou | B60R 11/06 |

* cited by examiner

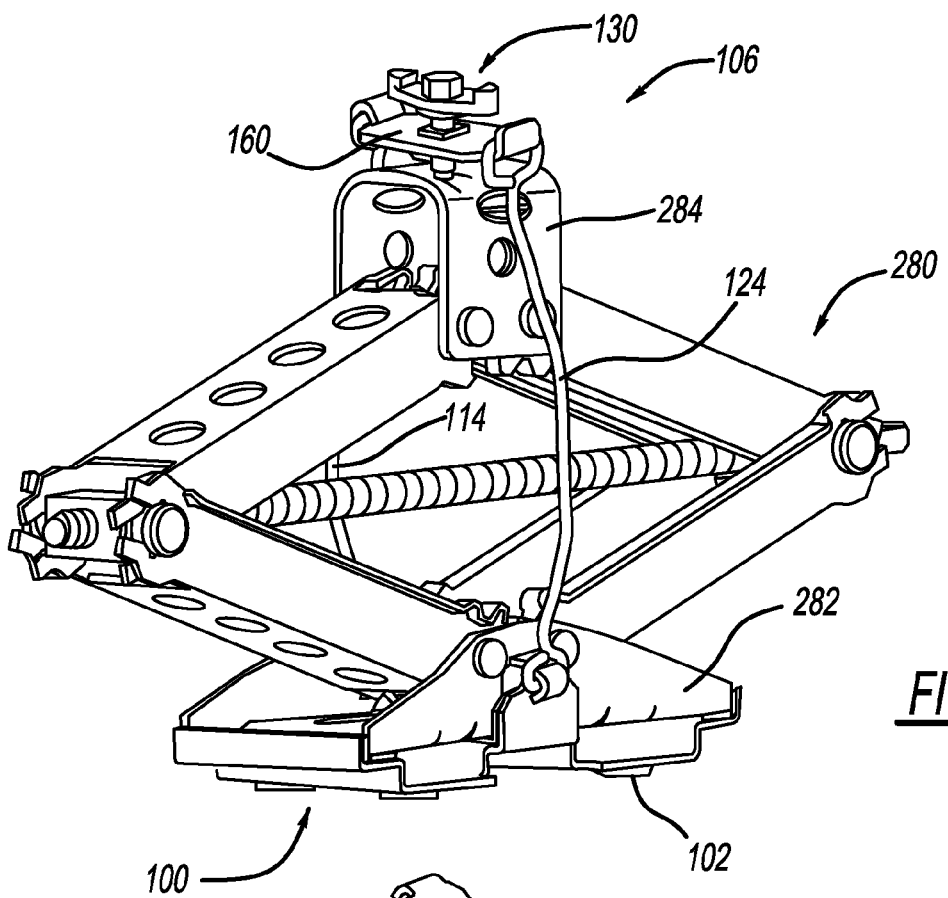
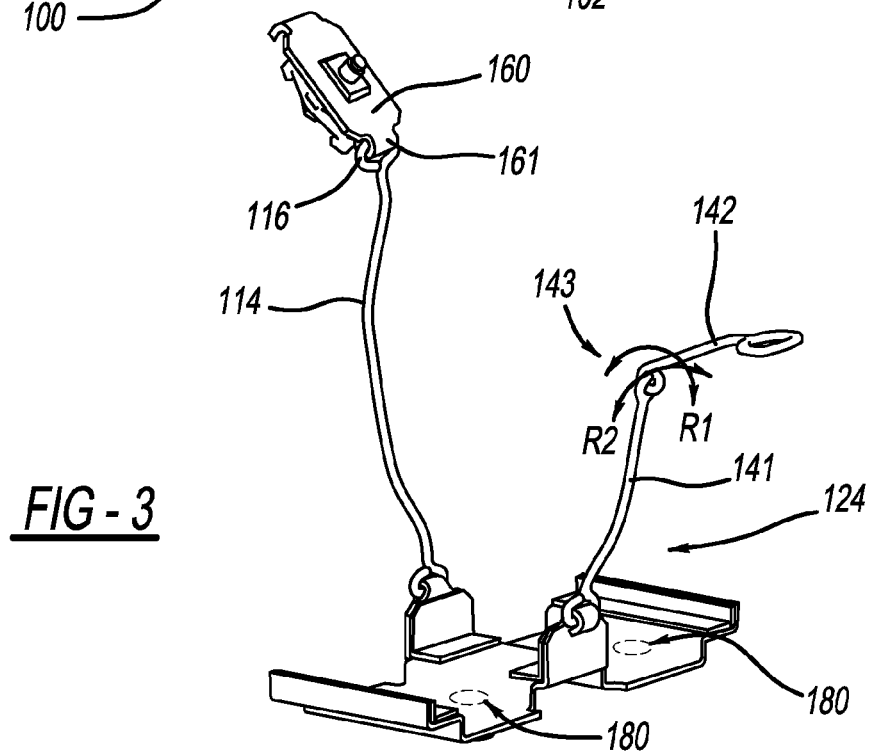
FIG-2
FIG-3

JACK-POSITIONING DEVICE

RELATED APPLICATION(S)

This application claims the benefit of Chinese New Invention Patent Application No. CN 201510438478.7, filed Jul. 23, 2015, the entire contents thereof being incorporated herein by reference.

TECHNICAL FIELD

The present invention relates to a jack-positioning device.

BACKGROUND

Jacks, and scissor-type jacks in particular, have been widely used in various circumstances. They are compact, safe, relatively light-weight, and able to uplift relatively heavy loads without unnecessarily having to need excessive force to be applied by a user. When not in use, the jack is often stored underneath the spare tire in the trunk, therefore it may not be as easy to have access to and to store the jack.

SUMMARY

In one or more embodiments, the present invention provides a jack-positioning device, which includes a base portion to support a seating bottom of a jack, an arm portion to connect the base portion, and a top portion to press against a loading table of the jack, where the top portion along with the arm portion is to position the jack at a holding position, and the arm portion is rotatable relative to the base portion and the top portion.

One or more advantageous features as described herein will be readily apparent from the following detailed description of one or more embodiments when taken in connection with the accompanying drawings.

BRIEF DESCRIPTION OF THE DRAWINGS

FIG. 2 illustratively depicts a view of the jack-positioning device referenced in FIG. 1A as positioned relative to a jack;

FIG. 3 illustratively depicts another alternative view of the jack-positioning device referenced in FIG. 1A.

DETAILED DESCRIPTION OF ONE OR MORE EMBODIMENTS

One or more embodiments of the present invention are detailed herein; however, it is appreciated these embodiments are representative and may be carried out in various alternative forms. The drawings are not necessarily in proportion and may be enlarged or minimized to show certain particular features. In the following description, various operating parameters and components are described for different constructed embodiments. These specific parameters and components are included as examples and are not meant to be limiting.

Certain existing jacks may be transversely mounted within a vehicle, such as at the bottom of a vehicle trunk in a transverse direction, which may require more space needed in such a direction. The present invention, in one or more embodiments, is advantageous in providing a jack-positioning device that may make a beneficial use of the space along a longitudinal or a vehicle height or gravity direction. To be used for a jack including a seating bottom and a loading table, the jack-positioning device includes a base portion to support the seating bottom of the jack, an arm portion to connect the base portion, and a top portion to press against the loading table of the jack, where the top portion along with the arm portion is to position the jack at a holding position, and the arm portion is rotatable relative to the base portion and the top portion. By this jack-positioning device, the jack may then be positioned within a limited space with greater ease and efficiencies. It is particularly beneficial in situations where the space in the transversal direction is limited and the space along the longitudinal or vehicle height or gravity direction may instead be used to position and store the jack with the jack-positioning device.

Figures 1A, 1B:
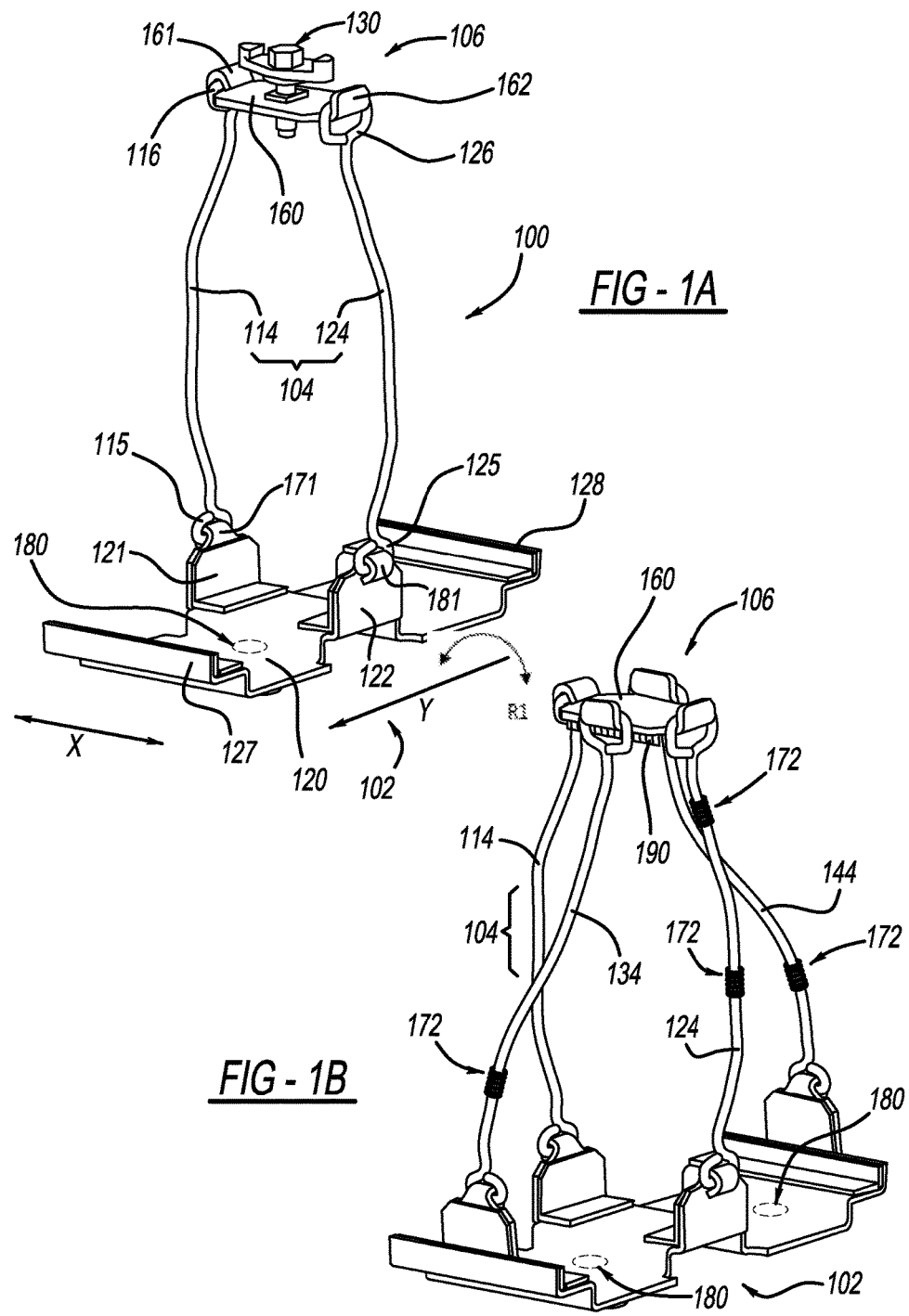
FIG. 1A illustratively depicts a view of a jack-positioning device according to one or more embodiments.
FIG. 1B illustratively depicts an alternative view of the jack-positioning device referenced in FIG. 1A.

As illustratively depicted in FIG. 1A and in view of FIG. 2, a jack-positioning device 100 is shown according to one or more embodiments of the present invention. A jack 280 includes a seating bottom 282 and a loading table 284. The jack-positioning device 100 includes a base portion 102 to support the seating bottom 282 of the jack 280, an arm portion 104 to connect the base portion 102, and a top portion 106 to press against the loading table 284 of the jack 280, where the top portion 106 along with the arm portion 104 is to position the jack 280 at a holding position, and the arm portion 104 is rotatable relative to the base portion 102 and the top portion 106 such that a relatively larger opening may be realized to receive the jack 280 with greater ease.

Referring back to FIG. 1A, the top portion 106 includes a holding plate 160, and the base portion 102 includes a base plate 120 and a pair of first and second ears 121, 122 extending from the base plate 120 and being spaced apart from each other along direction X. In certain embodiments, and as illustratively depicted in FIG. 1A, the positioning device 100 may further include a pair of third and fourth ears 127, 128 extending from the base plate 120, being spaced apart from each other and positioned to the two sides of the first and second ears 121, 122 along direction Y. The first, second, third and fourth ears 121, 122, 127, 128 may be collectively employed to limit movement of the jack 280 along direction X and direction Y. In one or more embodiments, direction X is a transverse direction, and direction Y is a longitudinal direction.

With further reference to FIG. 1A, the arm portion 104 may include a first arm 114 and a second arm 124 spaced apart from each other and to be connectable to at least one of the holding plate 160 and the base plate 120.

As illustratively depicted in FIG. 1A, the holding plate 160 may include a first top hook 161 and a second top hook 162 opposing and spaced apart from the first top hook 161 along direction X at an assembled position, where the first top hook 161 extends from one end of the holding plate 160 to form a hole with a cross-section thereof being a closed-loop, and the second top hook 162 extends from an opposing end of the holding plate 160 to form a rib with a cross-section thereof being an open-loop. The first arm 114 may pivot about the holding plate 160, for instance, along direction R1. The second arm 124 may pivot about the holding plate 160, for instance, along direction R1. The first arm 114 may not be detachable from the first top hook 161 of the holding plate 160 due to the closed-loop cross-section of the first top hook 161. The second arm 124 may be detachable from the second top hook 162 of the holding plate 160 due to the open-loop cross-section of the second top hook 162. At least one of the first and second arms 114, 124 may include first and second top rings 116, 126 to engage the first top hook 161 and the second top hook 162, respectively. In certain embodiments, the first and second arms 114, 124 may be spaced apart from each other along direction Y with connections similar to those depicted in FIG. 1A.

In one or more embodiments, and as illustratively depicted in FIG. 1A, the first arm 114 further includes a first base ring 115, the second arm 124 further includes a second base ring 125. The first arm 114 has its one end in pivotable connection with the first top hook 161 of the holding plate 160 via the first top ring 116 along, for instance, direction R1, and has another end in pivotable connection with the first ear 121 via the first base ring 115 along, for instance, direction R1. The second arm 124 has its one end in detachable connection with the second top hook 162 via the second top ring 126, and has another end in pivotable connection with the second ear 122 via the second base ring 125 along, for instance, direction R1. It is appreciated that at least one of the first and second arm 114, 124 may be detachable from the base portion 102 in certain particular embodiments.

The first and second top rings 116, 126 may each be a natural and integral extension of the first and second arms 114, 124, respectively. The first and second base rings 115, 125 may each be a natural and integral extension of the first and second arms 114, 124, respectively. Accordingly the first arm 114 and the first top and base rings 116, 115 may be of one-piece construction, and the second arm 124 and the second top and base rings 126, 125 may also be of one-piece construction.

When employing a connector pair such as the pair of the first top hook 161 and the first top ring 116 depicted in FIG. 1A, at least one of the first and second arms 114, 124 may pivot about the holding plate 160 in at least one direction, for instance, direction R1. When employing a connector such as the paired connector 143 depicted in FIG. 3, at least one of the first and second arms 114, 124 may pivot about the holding plate 160 in at least two directions, for instance, direction R1 and direction R2.

When employing a connector pair such as the pair of the first base hook 171 and the first base ring 115 depicted in FIG. 1A, at least one of the first and second arms 114, 124 may pivot about the base plate 120 in at least one direction, for instance, direction R1. When employing a connector such as the paired connector 143 depicted in FIG. 3, at least one of the first and second arms 114, 124 may pivot about the base plate 120 in at least two directions, for instance, direction R1 and direction R2.

When employing a connector pair such as the pair of the second top hook 162 and the second top ring 126, at least one of the first and second arms 114, 124 may be detachable from the holding plate 160.

When employing a connector pair such as the pair of the second base hook 181 and the second base ring 125, at least one of the first and second arms 114, 124 may be detachable from the base plate 120.

In certain embodiments, only one of the two arms 114, 124 may be employed to connect the base portion 102 and top portion 106, where the arm 114 or 124 may be tension charged and work to position the jack 280 along with a fastener 130. In this configuration, the jack 280 may be largely stabilized by being positioned between the base portion 102 and the fastener 130 of the top portion 106, with the arm 114 or 124 to keep the top portion 106 and the base portion 102 in suitable positional relationship between each other. In other words, and when the jack 280 is fastened via, for instance, the fastener 130, only one but not both of the arms 114, 124 may be sufficient for the positioning of the jack 280.

With continuing reference to FIG. 1B, an alternative view is depicted of the jack-positioning device referenced in FIG. 1A. The same reference numerals may be used herein to refer to the same components or their similar modifications and alternatives. The jack-positioning device 100 referenced in FIG. 1B may further includes a third arm 134 connected to the third ear 127 and the holding plate 160, and a fourth arm 144 connected to the fourth ear 128 and the holding plate 160, where at least one of the first, second, third and fourth arms 114, 124, 134, 144 may be an elastic member, for instance, may be formed of an elastomer polymer or include an elastomer polymer (not shown), or may be or include a metallic spring 172. At the assembled position, the second arm 124 is spaced apart from the first arm 114 along the direction X, and the fourth arm 144 is spaced apart from the third arm 134 along the direction Y different from the direction X. The holding plate 160 is tension-charged by at least one of the first, second, third and fourth arms 114, 124, 134, 144 at the assembled position such that the holding plate 160 is tightly pressed toward the loading table 284 of the jack 280. Thus, in this embodiment, the fastener 130 referenced in FIG. 1B may not necessary. In one or more embodiments, a cushion 190 is positioned on the surface of the holding plate 160 facing toward the base portion 102 to reduce frictional wear between the top portion 106 and the loading table 284, and hence any resultant noise.

The first, second, third and fourth arms 114, 124, 134, 144 may each independently be or include a metallic material for strength and elasticity, with non-limiting examples thereof including copper, steel, aluminum, and their suitable alloys.

FIG. 3 illustratively depicts an alternative design of the jack-positioning device referenced in FIG. 1A. The jack-positioning device 100 referenced in FIG. 3 differs from the jack-positioning device 100 referenced in FIG. 1A in that at least one of the first and second arms 114, 124 includes a first section connected to the base portion 102 and a second section connected to the first section. With particular reference to FIG. 3, the second arm 124 includes a first section 141 connected to the base portion 102 and a second section 142 in pivotable connection to the first section 141 such that the second section 142 is pivotable relative to the first section 141 at least in direction R1 and direction R2. This pivot structure 143 may be constructed from two ring portions connected to each other. In some other embodiments, the same pivot structure may be applied to the first arm 114, and even more than one pivot structure 143 may be employed.

As mentioned herein elsewhere, certain existing jack-holding devices are often located underneath the spare tire within the trunk or other locations of the vehicle, for instance but not limited to, at two opposing sides of the trunk; however, such configuration may unnecessarily take up space of the trunk. As need for vehicle comfort increases, a rear seat of the vehicle may be reclined, thus space may need to be set aside for the reclining purpose. It is often difficult to utilize such a space due to its irregular shape, with the size of which decreasing from bottom to top. As detailed herein in relation to FIG. 4, the present invention in one or more embodiments is advantageous at least in that the jack-positioning device 100 may just be stored and used in such a location where usage thereof may not be previously thought of or appreciated. Accordingly, not only an area of the vehicle interior space may now be effectively used, but also that such a use is well suited for storing the jack 280 as the area may be particularly narrow and tall to receive the jack 280 in its upright position, and the storage is relatively safe for vehicle occupants as the area is often light on activity traffic.

Figure 4:
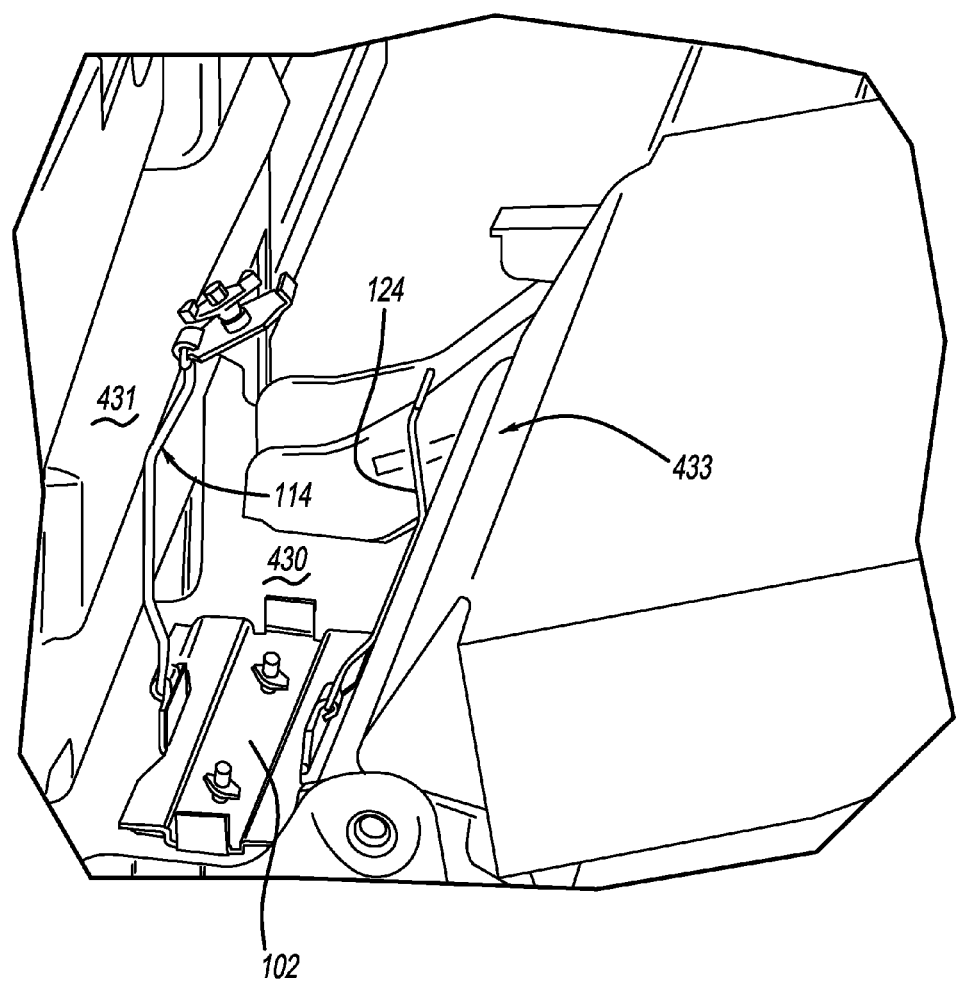
FIG. 4 illustratively depicts a view of a jack-positioning device as positioned on a vehicle floor according to one or more embodiments.

With further referenced to FIG. 4, the jack-positioning device 100 of the present invention in one or more embodiments may be mounted on the vehicle floor 430 and between the rear seat back 433 and trunk partitioning panel 431, and accordingly this design may effectively utilize the narrow and probably irregular space between the rear seat back 433 and the trunk partitioning panel 431. In this embodiment, to assemble or to dissemble the jack 280, the rear seat back 433 may be tilted forward. Under certain instances, for instance, when the base of the rear seat is not movable, rotational movement of the second arm 124 of the jack-positioning device 100 along the first direction may be restrained by the base of the rear seat, thus the size of an opening between the first and second arms 114, 124 may be limited. The jack-positioning device 100 as illustratively depicted in FIG. 3 may be particularly advantageous under this circumstance, where the second arm 124 includes the first section 141 connected to the base portion 102 and the second section 142 pivotably connected to the first section 141 such that the second section 142 may pivot relative to the first section 141 at least in the direction R1 or the direction R2 different from the direction R1. In doing so, the second section 142 of the second arm 124 may still rotate in the first direction to provide a relatively large opening between the first and second arms 141, 142 to receive the jack 280, even when movement of the first section 141 of the second arm 124 is limited due to the presence of the rear seat base.

Referring back to FIG. 1A, FIG. 1B, FIG. 3 and further in view of FIG. 4, the base portion 102 and in particular the base plate 120 thereof may be detachably connected to the vehicle floor 430 for added stability at the assembled position. The connection may be realized via any suitable methods, such as via fasteners (not shown) to be positioned at apertures 180 of the base plate 120.

The base portion 102 may be of any suitable shape, dimension and material. The base portion 102 does not have to be configured to include ears 121, 122, 128 and 127 in raised elevations, as long as the base portion 102 may be detachably connected to the first, second, third and fourth arms 114, 124, 134 and 144. The base plate 120 of the base portion 102 may be of oval, circle, rectangle, or other symmetrical or non-symmetrical shapes.

The top portion 106 and the base portion 102 may each be independently of any suitable and durable materials, with non-limiting examples thereof including metals, polymers and their combinations.

In certain embodiments, and further in view of FIG. 4, the base portion 102 may be configured to be of dimensions along directions X and Y that are in alignment with the dimensions of the seating bottom 282 of the jack 280.

The present invention has been described in relation to one or more embodiments. One skilled in the art will readily recognize from such discussion, and from the accompanying drawings and claims that various changes, modifications and variations can be made therein without departing from the true spirit and fair scope of the invention as defined by the following claims.

What is claimed is:

1. A jack-positioning device of a jack including a seating bottom and a loading table, the jack-positioning device comprising:

a base portion to support the seating bottom of the jack and include a base hook;

an arm portion to connect the base portion and include a base ring and a top ring; and a top portion to press against the loading table of the jack and include a top hook, wherein the top portion along with the arm portion is to position the jack at a holding position, and wherein the base hook is received in the base ring and the top hook is received in the top ring and the arm portion is rotatably connected to the base portion and the top portion.

2. The jack-positioning device of claim 1, wherein the top portion includes a holding plate, the base portion includes a base plate, and the arm portion includes a first arm and a second arm separable from each other and connectable to at least one of the holding plate and the base plate.

3. The jack-positioning device of claim 1, wherein the top portion includes a fastener for connecting the loading table to the top portion.

4. The jack-positioning device of claim 1, wherein the arm portion includes a spring element so as to be tension-charged.

5. The jack-positioning device of claim 1, further comprising a cushion to be positioned between the top portion and the loading table of the jack.

6. The jack-positioning device of claim 2, wherein at least one of the first arm and second arm is rotatable in at least one direction about the holding plate.

7. The jack-positioning device of claim 2, wherein at least one of the first arm and second arm is rotatable in at least one direction about the base plate.

8. The jack-positioning device of claim 2, wherein at least one of the first arm and second arm is detachable from the holding plate.

9. The jack-positioning device of claim 2, wherein at least one of the first arm and second arm is detachable from the base portion.

10. The jack-positioning device of claim 2, wherein the top hook includes a first top hook extending from one end of the holding plate to form a hole with a cross-section thereof being a closed loop, and a second top hook extending from an opposing end of the holding plate to form a rib with a cross-section thereof being an open loop, and the top ring includes a first top ring formed by an integral extension of the first arm and the second top ring formed from an integral extension of the second arm, wherein the first top hook is received in the first top ring and the second top hook is received in the second top ring.

11. The jack-positioning device of claim 2, wherein at least one of the first arm and the second arm includes a first section connectable to the base portion and include a first ring portion and a second section includes a second ring portion, wherein the first ring portion is interconnected with the second ring portion such that the second section is pivotable relative to the first section at least in a first direction and second direction different from the first direction.

12. The jack-positioning device of claim 2, further comprising a third arm and a fourth arm, wherein at an assembled position, the second arm is spaced apart from the first arm in a first direction, and the fourth arm is spaced apart from the third arm in a second direction different from the first direction.

13. The jack-positioning device of claim 12, wherein the base portion further includes first and second ears extending from the base plate to contact the first and second arms, respectively, and third and fourth ears extending from the base plate to contact the third and fourth arms, respectively.

14. A jack-positioning device for holding a jack that has a seating bottom and a loading table, the jack-positioning device comprising:
   a base plate for supporting the seating bottom of the jack and include a first base hook and a second base hook;
   a holding plate for pressing against the loading table of the jack and include a first top hook at one end and a second top hook at an opposite end;
   a first arm and a second arm for connecting the base plate with the holding plate to create a space for holding the jack at a holding position, wherein the first arm includes a first base ring and a first top ring connected to the first base hook and the first top hook, respectively, and the second arm includes a second base ring and a second top ring connected to the second base hook and the second top hook, respectively such that the first arm and the second arm are rotatably connected to the to the base plate and the holding plate.

15. The jack-positioning device of claim 14, wherein the first top hook forms a closed-loop from an extension of the holding plate and the second top hook forms an open-loop from an extension of the holding plate to allow detachment of the second top ring of the second arm from the holding plate.

16. The jack-positioning device of claim 15, wherein the first top ring and the first base ring of the first arm is a natural and integral extension of the first arm, respectively, and the second top ring and the second base ring of the second arm is a natural and integral extension of the second arm, respectively.

17. The jack-positioning device of claim 14, wherein at least one of the first and second arms has a spring element so as to be tension-charged.

* * * * *